UNITED STATES PATENT OFFICE.

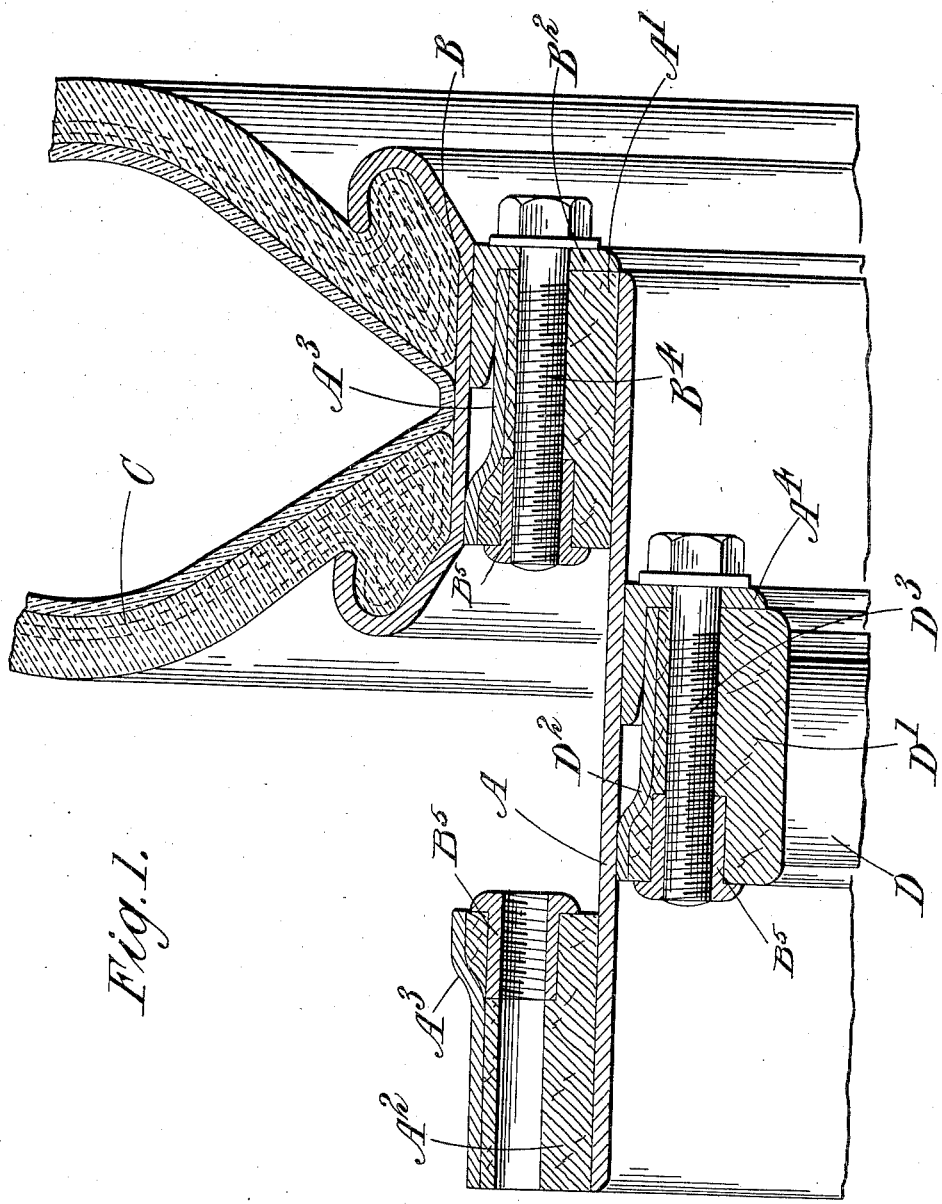

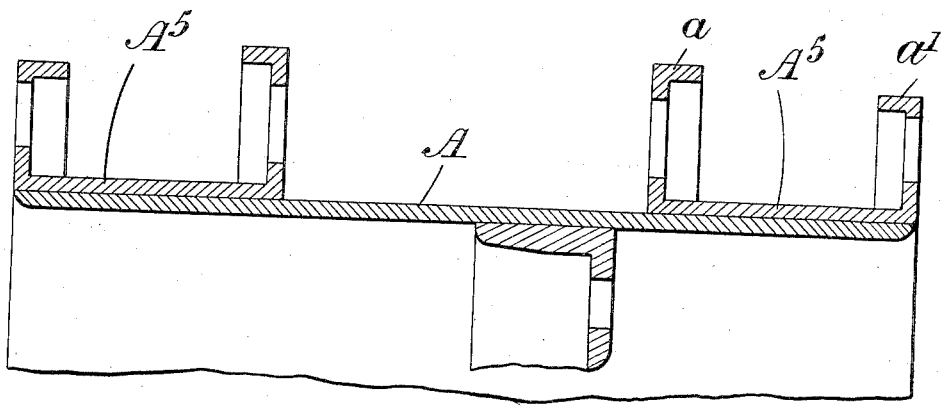
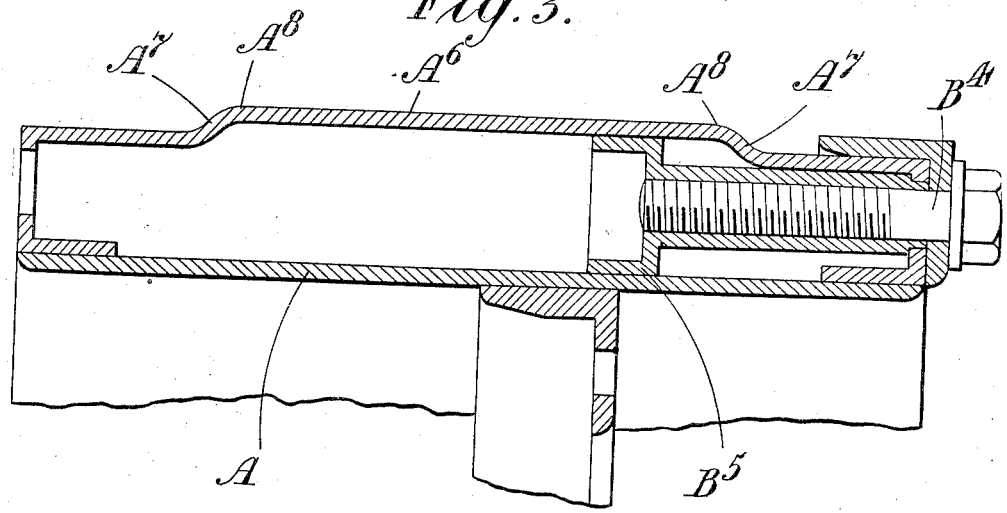

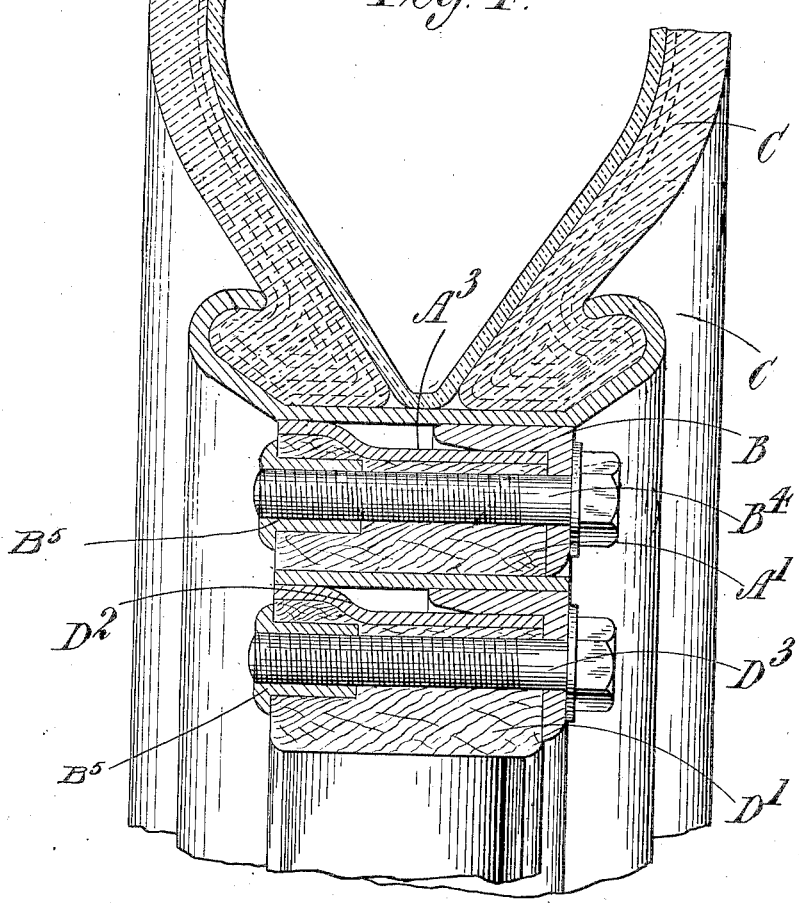

SYDNEY ALLEN CURRIN, OF BRISTOL, ENGLAND.

VEHICLE-WHEEL.

1,081,216. Specification of Letters Patent. Patented Dec. 9, 1913.

Application filed December 27, 1911. Serial No. 668,072.

*To all whom it may concern:*

Be it known that I, SYDNEY ALLEN CURRIN, a subject of the King of England, and residing in Bristol, county of Gloucester, England, have invented certain new and useful Improvements in Vehicle-Wheels, of which the following is a specification.

This invention relates to detachable rims for pneumatic tires and particularly refers to multi-tired wheels for heavy motor or other vehicles.

The invention is applicable with detachable rims of various kinds, and, though especially designed to include the device described in British specifications Nos. 26619/09 and 2805/10 well known as the "Captain" detachable rim, it is not intended to limit the scope of the present invention to that particular type. The references thereto throughout this specification are merely illustrative.

In the "Captain" wheel a detachable rim is provided in which the wheel proper or large hub forming the standing portion of the wheel has at the periphery of the felly a metal plate of larger diameter at one side than at the other. The inside periphery of the detachable rim is also made of two diameters to correspond with those of the felly so that it fits and beds thereupon. An internally projecting flange on the side of the smaller diameter forms part of or is secured to the detachable rim and through this and the felly a suitable number of bolts or screws pass, screwing into nuts or internally threaded tubular members in or upon the felly so as to securely hold the rim in place.

The object of the present invention is to provide a multiple "detachable" rim so arranged that each or all of the tires of a multi-tired wheel may be readily removed together with their respective rims; and the word "detachable" is intended to comprise that kind of device in which the tire rim or a part bearing the same, may be removed without the application of numerous or heavy tools such as are in some cases required to exert considerable pressure before the process of removal can be performed. "Detachable" is therefore to be understood throughout this specification and accompanying claims to refer to a device readily operated by the hands, aided or not by some simple tool such for example as a spanner.

According to the present invention the "Captain" principle is extended so that a multiple "detachable" rim is provided wherein the rims are detachable individually or collectively.

The individual detachable rims are borne by an intermediate member which may take the form of a sole-plate or drum which is itself detachable from the wheel felly. This detachment of the intermediate member leaves the wheel felly free for the attachment of a single tire-rim should it be desired, for instance, to load the vehicle less heavily than usual.

It is a feature of this invention that the felly of the wheel bears a detachment device to which either the intermediate member or a single tire-rim may be attached; the several tire-rims and detachment devices appertaining to them are conveniently made to a standard of size and form, constructed in accordance with the method used in the "Captain" device described in British specifications Nos. 26619 of 1909 and 2805 of 1910 already referred to.

The actual form of the intermediate member may vary according to circumstances. For instance, it may be built up of wood and metal, or may be built up entirely of metal, or formed in one piece.

In the accompanying drawings:—Figure 1 is a part sectional elevation of the complete device applied to a twin-tired wheel; Fig. 2 is a similar view in which the intermediate member is built up of metal parts; Fig. 3 is again a similar view in which the intermediate member is made up of a sole plate and a single metal stamping secured to the plate, and, Fig. 4 is a similar view showing the application of a single-tire-rim, after the intermediate member has been removed.

Like letters refer to like parts throughout the drawings.

Referring to Fig. 1, the intermediate member is made up of a plate A and two fellies $A^1$, $A^2$, in this case of wood riveted or otherwise secured to A. Each of these fellies is formed at $A^3$ so as to receive a detachable rim such as B constructed in accordance with the method referred to above with an internally depending flange $B^2$ through which pass the fixing bolts $B^4$ that have screw-threaded engagement with threaded socket pieces $B^5$ that are set within the felly. A tire C is indicated in place on the right-hand side of this view. Depending from the intermediate member A is a flange $A^4$ of angle section which is arranged to correspond with the felly $D^1$ of the wheel D in turn constructed with the curved portion $D^2$ and fixing bolts $D^3$ to form, in conjunction with $A^4$, a detachment device for the intermediate member A and the various parts borne thereby. The three fellies $A^1$, $A^2$, $D^1$ are conveniently made to standard sizes and form.

For heavier types of wheel it may be convenient to provide an all metal construction for the intermediate member such as is indicated in Figs. 2 and 3. In Fig. 2 the wooden fellies $A^1$, $A^2$ of Fig. 1 are replaced by an angle (or channel) construction as at $A^5$ of which the portion (or limb) $a$ is higher than the portion (or limb) $a^1$. $A^5$ is riveted or otherwise secured to the plate A as before. In Fig. 3 instead of having the two parts $A^5$ the intermediate member is made up of a hollow ring $A^6$ formed in one piece similarly secured to and extending entirely around the sole-plate A; it is also shaped to provide the two diameters for each rim as at $A^7$, $A^8$ and provided at intervals with screwed tubular members $B^5$ which receive the fixing screws or bolts $B^4$.

It will be seen that when it is desired to detach the tires and their rims this may either be done by removing the tires individually by taking out the bolts $B^4$ or collectively by taking out the bolts $D^3$ so that the intermediate member may itself be removed from the felly of the wheel proper.

It will further be seen that having removed the intermediate member and the several tires borne by it the wheel felly proper (that is $D^1$) is now free to receive a single tire-rim and tire in case, for example, it might be desired to run the vehicle lightly loaded. A larger tire would, in this case, be preferable in order to make up the requisite diameter of the wheel. Alternatively the ordinary single detachable rim may be placed upon the detachable felly which is already secured on the wheel or hub member so that there are then a detachable rim and a detachable felly one outside the other with if necessary a false felly or distance piece between the detachable felly and the wheel or hub member to fill up any space, as in Fig. 4. The sizes of the detachable felly and detachable rim normally may be equal or not to accommodate such sizes of tire as will, for instance, make up the same or different diameters of the tired wheel in either case.

With the modification necessary for different constructions of detachable rims, this invention, as stated, can be applied to other types of detachable rim.

What I claim as my invention and desire to secure by Letters Patent is:—

1. The combination with a wheel felly having a felly band, of a tire supporting and securing means therefor comprising a supporting ring mounted on said felly band; a second felly mounted on said supporting ring; a ring of angle iron construction secured to said supporting ring and having one portion thereof disposed inwardly and against the side of the first-named felly; screw-threaded socket pieces set within the first-named felly; bolts passing through the inwardly disposed portion of said angle iron ring and the felly and engaging with said screw-threaded socket pieces for securing said supporting ring and the second-named felly; and a tire engaging rim mounted on said second felly, substantially as described.

2. The combination with a wheel felly having a felly band with a raised peripheral portion, of a multi-tire supporting means mounted thereon comprising a relatively broad annular plate mounted between its side edges on the felly; a ring of angle iron construction secured to said annular plate between said plate and the felly and disposed against one side of the felly; socket pieces set within said felly; bolts passing through said inwardly disposed portion of the ring, and engaging with said socket pieces for holding said annular plate secure to the felly; a pair of second fellies mounted on said annular plate at either side of the first-named felly and each having a means for securing a tire rim thereto.

In testimony whereof I have signed my name to this specification in the presence of two subscribing witnesses.

SYDNEY ALLEN CURRIN.

Witnesses:
    E. J. BUSSELL,
    E. TYLER.